(12) United States Patent
Swanburg et al.

(10) Patent No.: US 8,452,329 B2
(45) Date of Patent: May 28, 2013

(54) MULTILAYER CORRELATION PROFILING ENGINES

(75) Inventors: Scott Allen Swanburg, Duluth, GA (US); Mark Wuthnow, Austin, TX (US); James Patrick Ryan, Roswell, GA (US); Herman Chien, Redmond, WA (US); Roger Julian Smith, Woodinville, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 13/569,076

(22) Filed: Aug. 7, 2012

(65) Prior Publication Data

US 2012/0304070 A1 Nov. 29, 2012

Related U.S. Application Data

(63) Continuation of application No. 11/634,223, filed on Dec. 6, 2006, now Pat. No. 8,238,939, which is a continuation-in-part of application No. 11/545,600, filed on Oct. 11, 2006, now Pat. No. 8,155,696.

(60) Provisional application No. 60/741,444, filed on Dec. 2, 2005.

(51) Int. Cl.
  *H04M 1/00* (2006.01)
(52) U.S. Cl.
  USPC .................................... 455/556.2; 707/621
(58) Field of Classification Search
  USPC ................ 455/3.06, 566, 432.3, 556.2
  See application file for complete search history.

(56) References Cited

U.S. PATENT DOCUMENTS

2005/0266835 A1* 12/2005 Agrawal et al. ............ 455/414.3
2007/0093264 A1* 4/2007 Srinivasan et al. ......... 455/556.1

* cited by examiner

*Primary Examiner* — Tu X Nguyen
(74) *Attorney, Agent, or Firm* — Hartman & Citrin LLC

(57) ABSTRACT

A profiling engine is disclosed. The profiling engine collects information from a variety of sources in real time and stores the information in a profile. The profile may have a number of layers, each layer having a number of categories. The profile is made available for use by applications and services.

13 Claims, 3 Drawing Sheets

US 8,452,329 B2

MULTILAYER CORRELATION PROFILING ENGINES

This U.S. Utility Patent Application is a continuation of U.S. patent application Ser. No. 11/634,223, filed Dec. 6, 2006, now U.S. Pat. No. 8,238,939; which is a continuation-in-part of U.S. patent application Ser. No. 11/545,600, filed Oct. 11, 2006, now U.S. Pat. No. 8,155,696; which claims priority to U.S. Provisional Patent Application Ser. No. 60/741,444, filed Dec. 2, 2005; the contents of all of which are hereby incorporated by reference herein in their entirety into this disclosure.

BACKGROUND OF THE INVENTION

1. Field of the Invention

The present invention relates to data collection over networks. More particularly, the present invention relates to generating profiles of users and communities.

2. Background of the Invention

Companies operating on the Internet or other networks currently have access to a vast amount of information about their customers and about the people who visit their web sites. These companies record every transaction their customers make on the company's website. In addition, the companies can use cookies to monitor the user's interaction with their web sites as well as with other web sites the customer visits while the cookie remains active. Monitoring the user transactions and the cookies gives the company insight into the user's interests. The company may then in turn use the information it has derived to offer customized products and services to the user or to target advertising at the user. For example, a customer may visit an online bookstore and primarily purchase science fiction and fantasy novels. Using this information, the next time the customer visits, the company may post an announcement about a newly released science fiction novel. The company may also sponsor an advertisement for a new fantasy role-playing game by the game's manufacturer. Not only does the company's use of information increase the likelihood of the customer making another purchase, but it also increases the efficiency of advertising the company sponsors. The company sells its products more effectively, and the advertisers receive more sales per advertising dollar.

Network operators also collect information about users of the network. Every time a client uses an application or service, such as text messaging, a billable event is generated and recorded. The network operators can use the information generated to offer tailored products and services to users. For example, if a user uses a mobile web service to view sports pages, the network operator can offer sports-related content to the user.

However, the current techniques for information gathering have several problems. First, network operators do not receive billing data until after the bill has been reconciled. This may result in information being delayed six to eight weeks. Network operators cannot, therefore, respond to users' actions in real time. For example, a user might be surfing the web using a mobile web service to look for a new car. By the time the network operator learns of this, six to eight weeks later, the user has already purchased the car and the network operator cannot provide any services to assist the user in purchasing the car.

The "back office" profiling systems used by companies for targeted advertising have problems as well. These systems, while they do compile information in real time, are designed for the benefit of the companies, not the users. The company collecting the information gains from the increased efficiency targeted advertising provides. The user gains only to the extent the user is able to purchase items he or she might not have known of before. However, these systems do not help the user streamline his daily routines or increase personal efficiency.

What is needed, therefore, is a profiling system that collects information about users in real time so that the user himself may benefit directly from the information about his daily life.

SUMMARY OF THE INVENTION

The present state of affairs regarding profiles in a network is inefficient in that it fails to provide tangible benefits to the individual being profiled and does not operate in real time. The present invention solves this problem by generating a user profile in real time based on information available in a network. The profile is then made available to applications and services in the network so that those applications and services can assist the user in the performance of his daily tasks. By doing so the user's own network experience is enhanced.

In one exemplary embodiment, the present invention is a multilayer correlating profiling engine. A plurality of profiling engines compile user information, in real time, into a plurality of profiles. A data repository stores the plurality of profiles generated by the plurality of profiling engines. The plurality of profiles are available to applications and services on either a network or a device.

In another exemplary embodiment, the present invention is a computer readable medium with data stored therein. The data comprises a plurality of profiles. The profiles are compiled from user information collected in real time from networks and user devices. The plurality of profiles are available to applications and services on a network or on a user device.

In yet another exemplary embodiment, the present invention is a method for generating a profile. The method comprising the steps of collecting user information from a plurality of sources; compiling the user information into a plurality of profiles; storing the plurality of profiles into a data repository; and making the plurality of profiles available to a plurality of applications and services.

DETAILED DESCRIPTION OF THE INVENTION

The present invention provides for profiling engines. The profiling engines gather information about a user in real time. This information can come from a user's interaction with the network, with applications on a user's mobile device, or from any other source. The information can exist in a variety of layers and in a variety of categories within each layer. The profiling engines compile the information gathered, in real time, into a profile. The network can use the information stored in the profile to increase the network's intelligence about the user and to enhance the user's network experience.

Figure 1:
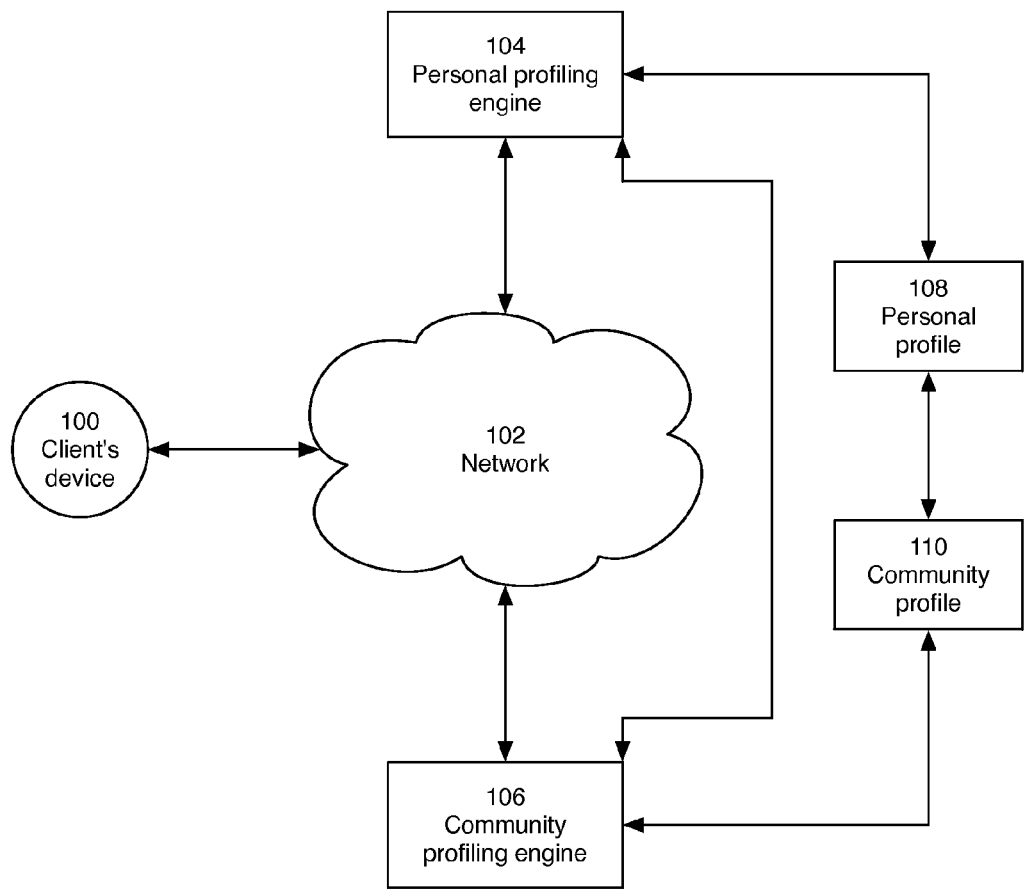
FIG. 1 shows a network, profiling engines, and profiles according to an exemplary embodiment of the present invention.

An overview of a network environment employing an exemplary embodiment of the present invention is shown in FIG. 1. Two profiling engines, personal profiling engine 104 and community profiling engine 106, gather data about a client 100 (represented in FIG. 1 by the client's device). The data can come from any source, such as network 102. For example, every time client 100 interacts with network 102, personal profiling engine 104 and community profiling engine 106 collect information about the interaction. The information could be any sort of information, including a service accessed by the client 100, the content accessed by the client 100 using the service, or the particular protocols associated with the service accessed by the client 100. The profiling engines 104 and 106 can also collect other information, including the client 100's current location, the time of day client 100 accesses the network or a particular service, or the client 100's current device. Client 100 may be operating a mobile device or any other device.

Regardless of the particular type of information collected, personal profiling engine 104 collects the information and compiles it into a detailed personal profile 108 of an individual user. The network then uses the information in the personal profile 108 to increase the network's intelligence about a particular client or to provide tailored services to the client 100. For example, personal profile engine 100 might collect data from the client's web surfing suggesting that client 100 is a fan of a particular football team. Profiling engine 104 stores the name of the football team into client 100's personal profile 108. Later, when client 100 accesses a football game application, the football game application can itself access personal profile 108, determine the user's favorite football team, and automatically populate the game with players from that football team. The user does not need to populate the game with players himself. Indeed, from the user's perspective the network has intelligence about him and appears to be making an effort to make his life easier.

Community profiling engine 106 performs data collection similar to personal profiling engine 104. However, community profiling engine 106 gathers data not only from sources such as network 102, but also from personal profiles such as personal profile 108. Community profiling engine 106 uses the data it collects to correlate clients with common interests. The resulting set of social networks are stored by community profiling engine 108 as community profile 110. Network 102 can use the information stored in community profile 110 to provide services to the client and to enhance the client's experience. Continuing with the example above, the client may access the football game application looking to play a football game with other users. The football game application may access a community profile 110 associated with the client's favorite football team and use the information to suggest people who are available and who also are fans of client 100's football team. The client does not need to search out other players; the network, using community profile 110, does it for him.

Community profiling engine 106 can generate community profiles in one of several ways. One way is for community profiling engine to drill through personal profiles such as personal profile 108, looking for matches for particular predefined criteria. Those profiles that match predefined criteria are referenced in community profile 110, creating a social network or community. Another way is for the community profiling engine to examine the personal profiles without reference to predefined criteria. Instead, the community profiling engine 106 uses known techniques for sorting, searching, and compiling data to create social communities on the fly.

Both of the techniques described above have advantages. The first technique enables the community profiling engine to quickly create social communities that the network wants to use. For example, if the network operator has an agreement with the National Football League (NFL), the operator can create predefined criteria for particular football teams. The network operator is then assured of social communities that will provide value not only to the clients (through the NFL agreement) but also to the network operator. The second technique has the advantage of allowing the network, through the community profiling engine 106, to discover new connections among individual clients not immediately obvious, opening the network to new opportunities and efficiencies. Any technique or combination of techniques for collecting and correlating information to create a community profile is possible.

Figure 2:
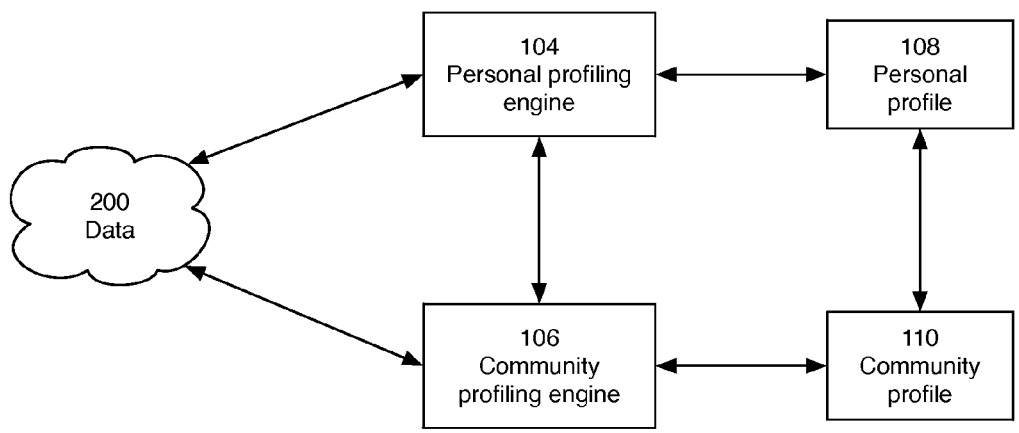
FIG. 2 shows a view of a profiling engine collecting information and compiling it into a profile according to an exemplary embodiment of the present invention.

FIG. 2 is another view of a network utilizing the present invention, emphasizing the varied nature of the data that profiling engines 104 and 106 may use in compiling their respective profiles 108 and 110. Data 200 can come from any source, whether in a network or not. Profiling engines 104 and 106 may collect data from the network, applications and services within the network, or from a client's interaction with the network. Other sources of data include the client's device, applications on the client's device, and interactions between the client and applications on the client's device.

In addition to collecting data from any source, profiling engines 104 and 106 can collect any type of data 200 as well. The data can relate to a client's location, device, or the time of day. The profiling engines may also correlate location, device, or time information to the client's particular activities at a given location, with a given device, or at a given time. This allows the profiling engine to track the user's daily routines and allows applications and services accessing the client's personal profile to respond to the client's activity based on those correlations. In addition, the profiling engines can collect demographic information, application information, information about the user's interaction between multiple applications, and information about particular protocols the client is employing. In short, data 200 can be almost any kind of data imaginable.

Figure 3:
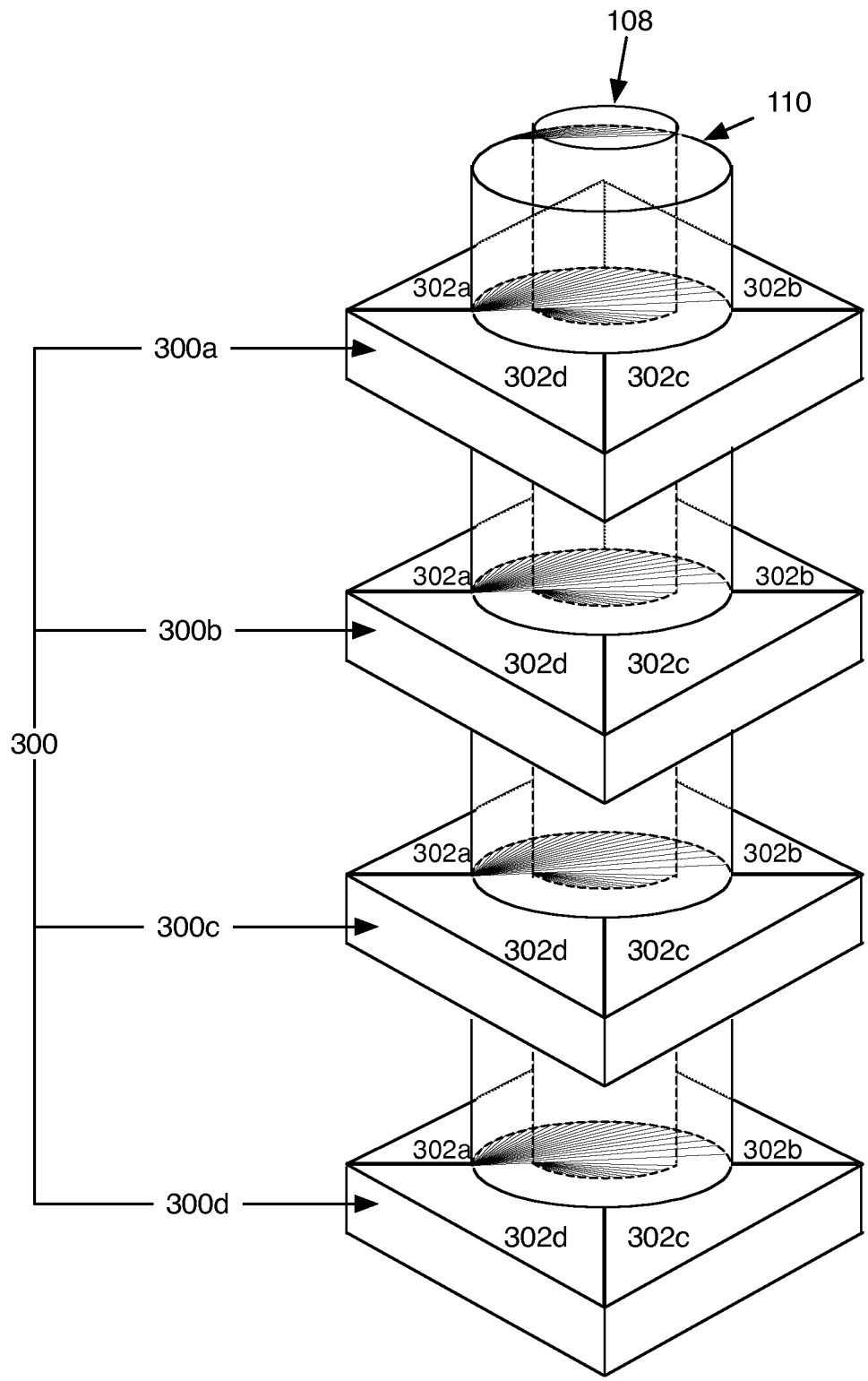
FIG. 3 shows a detailed view of data a profiling engine uses to compile the profiles according to an exemplary embodiment of the present invention.

FIG. 3 shows a model of the data that profiling engines 104 and 106 can collect. The model has multiple layers 300a, 300b, 300c, 300d. Each layer represents a particular collection point for data as well as a level of granularity. The lower the level of detail, the more detailed the information about the user. Each individual layer also has several categories, or subsets of information.

In one exemplary embodiment, shown in FIG. 3, the model has four layers, layers 300a, 300b, 300c, and 300d. The lowest layer, layer 300d, may represent signaling information. Signaling information relates to the protocols used to access applications or services on a network. All network usage involves one protocol or another. For example, when a client accesses a web page, an HTTP request is generated. The HTTP request is part of the signaling layer. Similarly, real time video streaming may use both SIP (Session Initiation Protocol) to initiate a video session and RTSP (Real Time Streaming Protocol) to stream the information. The signaling layer 300d collects this information, which may come in the form of events, data, or metadata. Events refer to something happening, such as an HTTP request. Data refers to the content of the request, and metadata refers to any metatags associated with the content. This difference between events, data, and metadata occurs throughout all the levels.

The second layer 300c may be the application layer. This layer contains information about the applications and services a client uses. As in all layers, application information may come from the network or from the client's device. For example, if the client uses a web browser to surf the Internet, this will be recorded in the application layer. Similarly, if the client accesses a calendar program on his mobile device, this information will also be recorded in the application layer. Traditional voice telephony is also an example of an application and will be recorded in the application layer. The applications layer stores information about any and all applications and services the client uses or accesses.

The third layer 300b may be the interrelations layer. This layer tracks the interrelations between the various applications and services the client uses or accesses. For example, if a client chooses to drop a song into a calendar to serve as an alarm, this interrelation of two applications (the music program and the calendar) is tracked in the interrelations layer. The interrelations layer may also keep track of the different forms of information (event, data, metadata) used by various applications. In another example, a client may access a football game application, creating an event. The client then configures the football game with player picks from his favorite NFL team, creating data. The interrelations layer tracks this interrelation of events in one application (accessing the football game) with data from another (the players from the NFL team, possibly selected from a web site).

The fourth and final layer 300a in this example may be the supersegmentation layer. This topmost layer is the broadest layer and may have less detail than any of the previous layers. The supersegmentation layer tracks and correlates information from multiple demographic groups that the client may be part of. Examples of supersegments are "youth," "male," "college," and "metro." Other supersegments are possible as well. Supersegments are created by correlating matching attributes for subscribers that meet particular criteria. Other ways of creating or identifying supersegments are possible as well. Supersegments could be created using the adaptive technique described above with respect to the community profiling engine. The information from which a particular supersegment is defined may be taken from any source, such as a backend billing system that associates users with particular predefined elements. Once a particular supersegment is identified, clients are associated with one or more supersegments and the information is made available for use.

Every layer 300a, 300b, 300c, and 300d has several categories. All layers may have the same categories or each layer may have different categories. Categories are subsets of the information collected in each layer. Similarly, each layer may have any number of categories or all layers may have the same number of categories.

In one exemplary embodiment of the present invention, each layer 300a, 300b, 300c, 300d has four categories 302a, 302b, 302c, 302d. Category 302a is voice, relating to voice communication. Category 302b is messaging, relating to other forms of messaging, such as e-mail, instant messages, or text messages. Category 302c is download. Information in this category relates to anything transferred from the network to a client's device. This could be applications (when the client downloads a new application from the network to use on his device), files, content, or any media. The final category in this embodiment is browse category 302d. The browse category is defined by any application or service that access a network source (such as an application server) based on a URL or IP address for the purpose not for downloading content but for gaining access to information stored on or offered by the network source. One example of information in the browse category is the information created through the act of surfing the web. When surfing the web, information is accessed by the client device but not downloaded onto it.

For example, the category download includes different types of information depending on the particular layer where the information is located. In the supersegmentation layer, the download category defines download types by segment, such as "youth," "male," or "college." Applications and services can access particular downloads used by a certain segment of clients. In the interrelation layer, the download category includes information about interrelated downloads. For example, in the example above, in the Interrelation layer the download category may include information about the interaction between a downloaded football game and the particular players chosen to configure the game.

The information in the download category becomes more detailed in the lower layers. In the application layer, the information in the download categories includes such things as a record of every application and content downloaded by a given client. Finally, the signaling layer provides the most detail. The information in the download category at the signaling layer includes the protocol used to download the information, such as HTTP, FTP, or TCP. Pertinent data associated with the particular protocols may also be included.

Other information sources can be used to collect information as well. These information sources can be location (the location of the client when a particular application, service, or content is accessed), time, and the client's device. This information exists across all levels. For example, in the application level the model can include the time when a particular application is accessed. Similarly, in the signaling level the model can include the location of client when a particular protocol (such as HTTP) is used.

The profiling engines take the information contained in the model shown in FIG. 3 and compile a profile with the same structure. The multilayered structure of the profiles enables applications and services to extract the information at a level of detail tailored to a particular need. Some applications may want to consider user information at the structural level, while others may only be interested in the interrelations between applications. For example, a customer efficiency service might examine a personal profile 108 to determine the way in which a client accesses particular applications on his device. The result of this examination may lead the customer efficiency service to conclude that the client is not accessing a particular commonly used application in the most efficient way possible—the client may use three screens to access the application instead of just one. The customer efficiency application then suggests the more efficient method to the client, thus increasing the client's efficiency. Similarly, a client device (or an application on a client device) can access the personal profile 108 to determine the ten applications/services the client most recently used. The device can then display this information (along with related information, such as the person to whom the client sent a text message) on a "recently used" menu. Since the device is accessing information from the personal profile, the menu will also list applications the client may have used in conjunction with another device.

In another example, a group messaging feature can access the personal profile 108 to determine a first client's availability for messaging; if the first client is available (his device is on, for example), the group messaging application can display an icon on a second client's device signaling the first client's availability. These examples showcase the nearly infinite ways the information stored in the profiles 108 and 110 can be used to increase the network's availability and intelligence to its clients.

Figure 4:
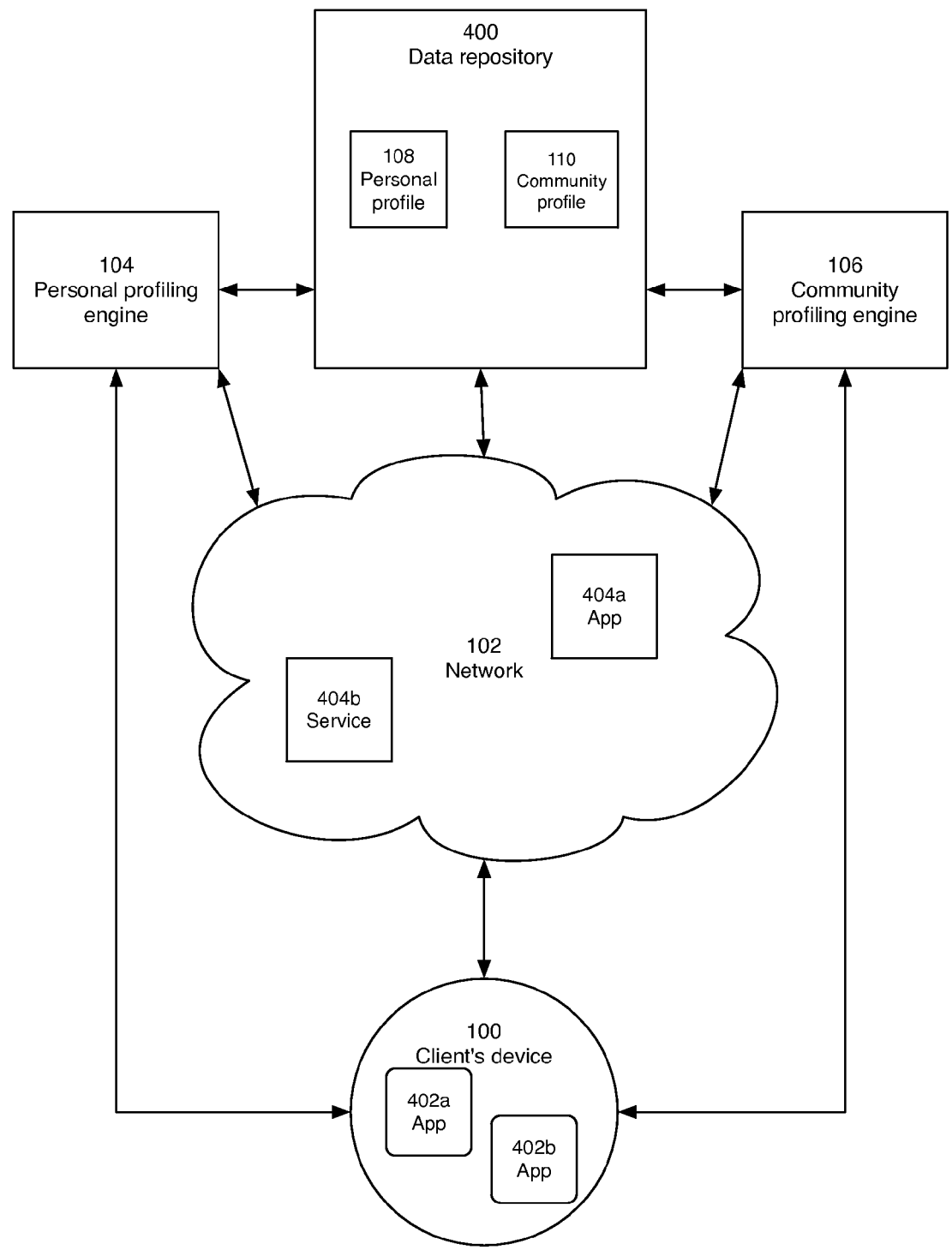
FIG. 4 shows a view of a network taking advantage of a profiling engine according to an exemplary embodiment of the present invention.

FIG. 4 shows an expanded view of an exemplary network employing the present invention, putting all the exemplary components together. Personal profiling engine 104 and community profiling engine 106 collect information from a variety of sources, including network 102 and client 100. Personal profiling engine 104 and community profiling engine 106 compile the information into personal profile 108 and community profile 110, respectively. The profiling engines 104 and 106 store the profiles 108 and 110 in data repository 400.

Applications and services, such as network applications and services 404a, 404b and client applications/services 402a and 402b, use the profiles 108 and 110 to increase the network's intelligence about its clients, to enhance the client's experience, to increase the client's efficiency, or for any other purpose. Since the profiles are generated and updated in real time and are always available, applications/services 402a, 402b, 404a, 404b will always have access to the most up to date information about clients and communities. Further, any application or service can access profiles in the data repository 400, regardless of where the application/service is located. Access is not limited to a particular subset of applications or services. By opening up the profiles, the present invention enhances the productivity and intelligence of the entire network and enables entirely new combinations of personalized applications and services to enhance the client's life and usage of the network. In addition, the client may have control over his personal profile for privacy purposes or to control access to his information.

Data repository 400 stores the profiles generated by personal profiling engine 104 and community profiling engine 106. There may be several data repositories located in the network for storing personal profiles. For example, one data repository might store only personal profiles and another data repository may store only community profiles. In larger networks, multiple copies of personal profile 108 and community profile 110 may also be distributed across multiple data repositories to reduce network congestion when accessing profiles. Other configurations are also possible. The nature and number of data repositories such as data repository 400 may vary according to the needs of the network where the present invention is to be deployed.

Similarly, personal profile engine 104 and community profiling engine 106 may be deployed anywhere in the network and on any platform, depending on the needs of the network where the present invention is operated. In some situations the functions of personal profiling engine 104 and community profiling engine 106 can be combined into one profiling engine. In other situations, such as in a large network, multiple personal profiling engines and multiple community profiling engines may collect information from a large number of clients. A smaller network, by contrast, could make do with one or two profiling engines. In some cases, profiling engines 104 and 106 may even collect information from multiple networks. Other configurations are also possible and within the purview and scope of the present invention.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method, comprising:
examining a personal profile of a client via a customer efficiency service to determine that an application is accessed on a device associated with the client using three different screens; and
providing a recommendation via the customer efficiency service to use only one of the three different screens to access the application, the recommendation resulting in an improved client efficiency;
wherein the personal profile includes a signaling layer for saving an event, a data, and a metadata, the event, the data, and the metadata corresponding to protocols used to access at least one of the application or a service on a network using the device.

2. The method of claim 1, wherein the personal profile is saved in a data repository.

3. The method of claim 2, wherein the data repository is located on the network.

4. The method of claim 1, wherein the signaling layer includes a plurality of categories, the plurality of categories including at least one of a voice category, a download category, a messaging category, or a browse category.

5. The method of claim 4, wherein the download category includes any data transferred from the network to the device.

6. The method of claim 1, wherein the personal profile is compiled using a personal profiling engine.

7. The method of claim 6, wherein the personal profiling engine collects at least one of a client location information, a device information, or a time information.

8. The method of claim 1, wherein the personal profile further includes an interrelation layer.

9. The method of claim 1, wherein the personal profile further includes a supersegmentation layer.

10. A system, comprising:
a data repository; and
a customer efficiency service in communication with the data repository, the customer efficiency service performing functions including:
examining a personal profile of a client to determine that an application is accessed on a device associated with the client using three different screens; and
providing a recommendation to use only one of the three different screens to access the application, the recommendation resulting in an improved client efficiency;
wherein the personal profile includes a signaling layer for saving an event, a data, and a metadata, the event, the data, and the metadata corresponding to protocols used to access at least one of the application or a service on a network using the device.

11. The system of claim 10, further comprising a personal profiling engine for creating the personal profile.

12. The system of claim 10, further comprising a data repository for saving the personal profile, the data repository being located on the network.

13. The system of claim 10, wherein the signaling layer includes a plurality of categories, the plurality of categories including at least one of a voice category, a download category, a messaging category, or a browse category.

* * * * *